United States Patent [19]

Brummett

[11] 4,111,289
[45] Sep. 5, 1978

[54] DIMPLED BIMETAL TEMPERATURE RESPONSIVE FAN DRIVE COUPLING

[75] Inventor: Earl Ray Brummett, Indianapolis, Ind.

[73] Assignee: Wallace Murray Corporation, New York, N.Y.

[21] Appl. No.: 785,038

[22] Filed: Apr. 6, 1977

[51] Int. Cl.² .................... F16D 35/00; F16D 43/25
[52] U.S. Cl. ................... 192/58 B; 192/82 T; 73/363.5; 236/101 E
[58] Field of Search .......... 192/58 B, 82 T; 73/363.5; 236/101 E

[56] References Cited

U.S. PATENT DOCUMENTS

| 3,155,209 | 11/1964 | Weir | 192/82 T X |
| 3,262,528 | 7/1966 | Weir | 192/58 B |
| 3,419,122 | 12/1968 | Connelly | 192/58 B |
| 3,463,008 | 8/1969 | Teichert et al. | 73/363.5 |

Primary Examiner—Allan D. Herrmann
Attorney, Agent, or Firm—Thomas J. Greer, Jr.

[57] ABSTRACT

A shear liquid fan drive assembly for the radiator cooling system of an internal combustion engine of the type wherein a temperature responsive valve controls the degree of rotary coupling between the engine and a radiator cooling fan by controlling the quantity of shear liquid between a driving disc and a driven housing carrying the fan. The specific improvement relates to a bi-metal strip for the temperature controlled fluid coupling, the strip being so configured that its improper placement on the fluid coupling results in maximum fluid coupling and hence maximum cooling of the engine by the fan.

2 Claims, 3 Drawing Figures

DIMPLED BIMETAL TEMPERATURE RESPONSIVE FAN DRIVE COUPLING

This invention relates to a viscous liquid fan drive for the radiator cooling system of an internal combustion engine. Such fan drives are well known and usually include a rotary drive disc which is driven by the engine. The drive disc is rotatably mounted within a housing or casing, with the casing carrying the blades of a fan. A quantity of viscous liquid, often termed a shear liquid, is admitted from a reservoir chamber to a drive chamber, the rotary disc being positioned in the drive chamber. Depending upon the amount of the shear liquid in the driving chamber the degree of rotary coupling between the driving rotor and the fan is varied. This variance is usually controlled by a temperature responsive valve assembly, the valve opening to admit a larger quantity of fluid when high cooling requirements are called for, and closing to limit the degree of rotary coupling when lower cooling requirements exist. Such assemblies include a passageway for the shear liquid between the radially outermost portion of the drive chamber in which the drive rotor is positioned and the reservoir chamber. The shear liquid is deflected so as to flow from the radially outermost part of the drive chamber through the passageway and thence to the reservoir chamber. Such devices are well known, and are presently classified in Class 192, Subclass 58 of the United States Patent Office classification. Such devices are further described in Society of Automotive Engineers publication 740,596 of August 12-16, 1974, by Everett G. Blair, hereby incorporated by reference. In general, such devices lower the power lost to the radiator cooling fan by correlating the fan power requirement with the engine cooling requirement at various engine speeds and ambient temperatures.

The temperature responsive valve assembly usually employs a bi-metal strip to determine the position of the valve, such position in turn controlling the amount of shear liquid which rotatably couples the engine power to the fan. Examples of bi-metal strip constructions of this type are afforded by the structures described in U.S. Pat. Nos. 3,179,221 and 3,191,733 to Weir, hereby incorporated by reference. The bi-metal strip must be properly oriented relative to the valve which it controls. Thus, when the bi-metal bows in one direction, it actuates the valve towards one position. Bowing of the bi-metal strip in the opposite direction actuates the valve toward the opposite position. In the usual valve assembly arrangement, lower engine ambient temperatures cause the bi-metal to bow in a direction to close the valve, higher engine ambient temperatures causing the opposite bowing direction and opposite valve action, i.e., the valve is opened.

In the assembly and in the repair of such temperature controlled fluid couplings, it is hence necessary that the bi-metal strip be properly oriented with respect to the valve. Thus, if high engine temperatures call for maximum shear liquid coupling to thereby effect maximum radiator cooling by the fan, improper bi-metal placement may result in engine overheating. If, for example, the bi-metal bows to close the valve at high engine temperatures, instead of bowing in a direction to open the valve, radiator cooling by the fan will be less than required and engine damage may occur.

According to the practice of this invention, a bi-metal strip is so configured that an incorrect placement or assembly of the bi-metal strip on the housing of the fluid coupling cannot result in overheating of the engine due to insufficient cooling action by the fan on the radiator. This is accomplished by providing the bi-metal strip with a dimple to thereby define a convex zone on one surface of the bi-metal strip and a concave zone on the opposite surface of the strip. During normal assembly and operation of the apparatus, the convex zone of the bi-metal strip contacts an actuating member for the valve. However, should the bi-metal strip be incorrectly placed on the fluid coupling, the concave zone will face the actuating member, with the construction and relationship of the parts being such that the valve will remain in the fully open position to thereby provide maximum cooling action by the fan at all times. While the bi-metal temperature control action will not be present during such mis-assembly (with consequent loss of efficiency otherwise enjoyed by proper matching of radiator cooling with engine cooling requirements), the coupling will nevertheless preclude engine overheating by virtue of constant operation in the maximum coupling condition.

Figure 1:
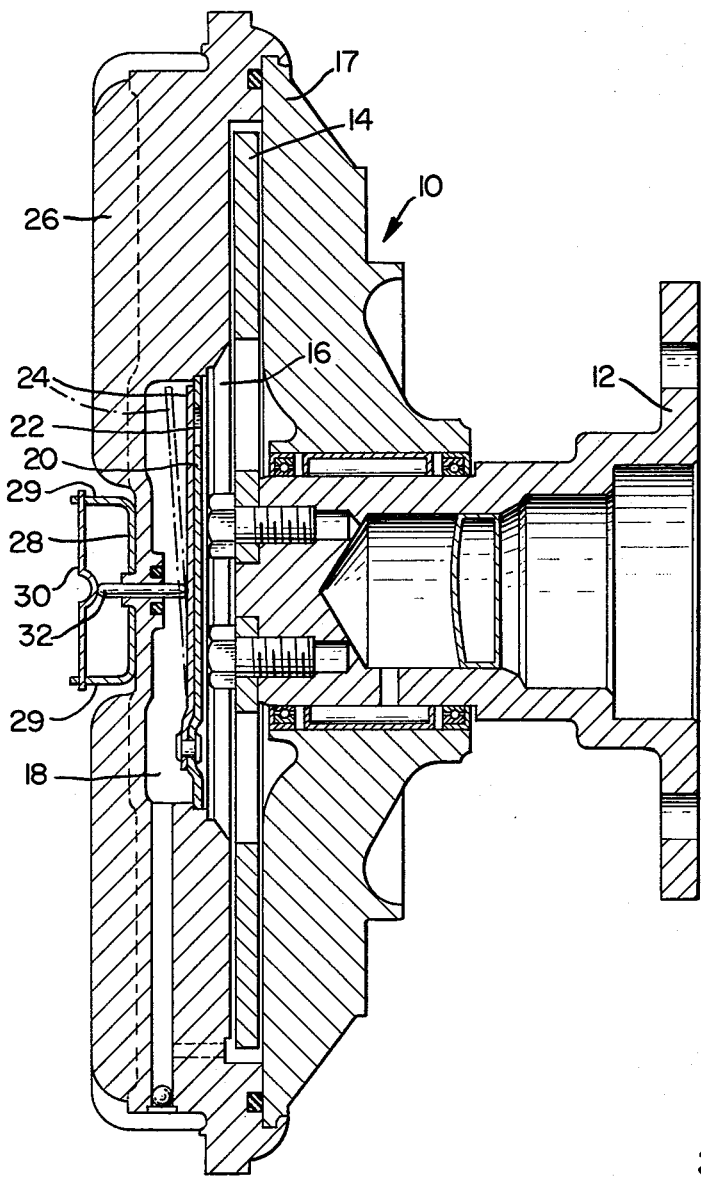
FIG. 1 is a cross-sectional view of a typical temperature controlled fluid coupling provided with the bi-metal strip configuration according to this invention.
Figure 2:
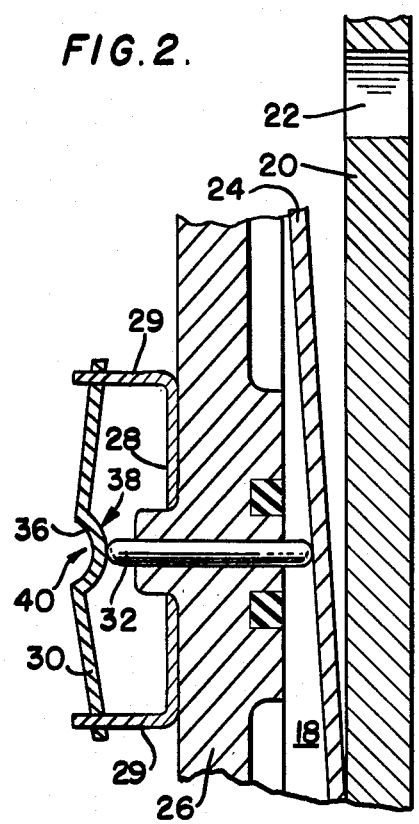
FIG. 2 is an enlarged view of a portion of FIG. 1.

Referring now to FIGS. 1 and 2 of the drawings, the numeral 10 denotes generally a typical temperature controlled fluid coupling for coupling the engine to the fan. The numeral 12 denotes a shaft adapted to be connected to a belt member, such as a pulley, in turn driven by the engine. The reader will understand that the radiator is to the left of the illustrated coupling 10. The numeral 14 denotes a drive disc coupled to shaft 12, the disc rotating in drive chamber 16 of fluid coupling housing 17, the housing being of a conventional construction. The housing carries a plurality of fan blades, not illustrated. The numeral 18 denotes a reservoir chamber which contains a quantity of a shear liquid, such as a silicone liquid. The numeral 20 denotes a partition which separates the drive chamber 16 (in which the drive rotor 14 rotates) and the reservoir chamber 18. The numeral 22 denotes a valve opening in partition 20, the opening adapted to be opened or closed by the action of flapper member 24, normally biased in the valve open position. Numeral 26 denotes a cover to which bracket 28 is attached. The numeral 28 denotes the bracket having upstanding ear portions 29 at each end thereof, the ear portions receiving the ends of bi-metal strip 30. The numeral 32 denotes an elongated rod for actuating the flapper 24. Dimple 36 is centrally provided on the bi-metal strip 30, thereby defining a convex zone 38 on one side of the strip and a concave zone 40 on the other side. The reader will note that convex zone 38 contacts one end of elongated rod 32.

The normal operation of the device shown at FIG. 1 is as follows. When engine temperatures are relatively high, maximum radiator cooling is required, this in turn requiring maximum liquid coupling between the input shaft 12 and the housing 17 which carries the fan blades. Bi-metal 30, in response to higher temperatures, bows towards the left as viewed at FIG. 1, thereby opening aperture 22 of partition 20 and providing a maximum quantity of shear liquid in drive chamber 16. In this manner, maximum shear liquid coupling between drive rotor 14 and housing 17 is realized. Contrariwise, relatively lower engine temperatures permit a lesser turning of the fan (with consequent saving of engine power), the bi-metal strip 30 bowing to the right as viewed at FIG. 1 to thereby close the opening 22. Such closure results in less shear liquid in driving chamber 16 with relatively greater slippage between input shaft 12 and its attached drive disc 14 and the housing 17.

Figure 3:
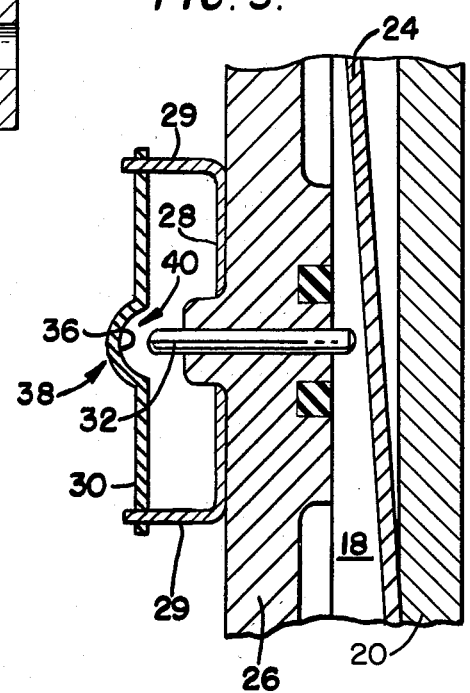
FIG. 3 is a view similar to FIG. 2 and illustrates the bi-metal strip incorrectly positioned.

Referring now to FIG. 3 of the drawings, a reversed position of bi-metal 30 relative to elongated rod 32 is shown. Such a reversed position might occur due to improper assembly of the coupling either at its place of initial manufacture or during repair or replacement of the bi-metal strip. The reader will observe that in this configuration, bowing of bi-metal strip 30 in either direction will not result in contact with elongated rod 32 and accordingly flapper 24 will remain in its normally biased open position. This in turn will result in a maximum of fluid coupling between drive shaft 12 and housing 17, in turn causing maximum cooling by the fan of the radiator of the engine. While this mode of operation will not be as efficient as the mode in the normal position shown at FIG. 1, it will nonetheless preclude overheating of the engine due to less than required cooling action of the fan under maximum engine temperature conditions.

What is claimed is:

1. A temperature controlled fluid coupling adapted to couple a radiator cooling fan of an internal combustion engine to the engine to thereby rotate the fan, the fluid coupling being of the type including a housing having a drive chamber into which a rotor extends and is positioned, a shear liquid reservoir chamber in the housing, the reservoir chamber communicating with the drive chamber through a temperature controlled valve, the amount of valve opening determining the degree of fluid coupling between the engine and the fan, the valve in one position establishing maximum rotary coupling, a bi-metal laminate mounted on the housing and actuating the valve by an elongated rod, bowing of the bi-metal laminate in one direction due to changes in its ambient temperature causing the valve to open and bowing of the laminate in the opposite manner causing the valve to close, the improvement comprising, the bi-metal laminate having a dimple to thereby define a convex zone on one surface and a concave zone on its other surface, the said elongated rod normally engaging one of said zones in a predetermined orientation of the bi-metal laminate relative to the valve, whereby mounting of the bi-metal laminate in an other orientation relative to the valve causes the valve to be fully open at all temperatures.

2. The temperature controlled valve of claim 1 wherein the convex zone of the bi-metal laminate normally contacts the said elongated rod.

* * * * *